United States Patent
Elmendorf et al.

(10) Patent No.: US 9,798,850 B2
(45) Date of Patent: Oct. 24, 2017

(54) SYSTEM AND METHOD FOR COMBINED PATH TRACING IN STATIC TIMING ANALYSIS

(71) Applicant: International Business Machines Corporation, Armonk, NY (US)

(72) Inventors: Peter C. Elmendorf, Poughkeepsie, NY (US); Kerim Kalafala, Rhinebeck, NY (US); Prabhat Maurya, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 54 days.

(21) Appl. No.: 14/987,967

(22) Filed: Jan. 5, 2016

(65) Prior Publication Data

US 2017/0193152 A1    Jul. 6, 2017

(51) Int. Cl.
  *G06F 17/00* (2006.01)
  *G06F 17/50* (2006.01)

(52) U.S. Cl.
  CPC ...... *G06F 17/5081* (2013.01); *G06F 2217/84* (2013.01)

(58) Field of Classification Search
  USPC ......................................................... 716/113
  See application file for complete search history.

(56) References Cited

U.S. PATENT DOCUMENTS

| | | | |
|---|---|---|---|
| 7,509,618 B1 | 3/2009 | Hutton | |
| 7,810,062 B2 | 10/2010 | Curtin | |
| 8,028,260 B1 | 9/2011 | Ravi | |
| 8,079,004 B2 | 12/2011 | Soviani | |
| 8,205,178 B2 | 6/2012 | Ravi | |
| 9,038,009 B2 | 5/2015 | Alpert | |
| 2003/0226126 A1 | 12/2003 | Iwai | |
| 2006/0248485 A1 | 11/2006 | Foreman | |
| 2008/0163147 A1* | 7/2008 | Gregerson | G06F 17/5031 716/108 |
| 2009/0044160 A1 | 2/2009 | Bueti | |
| 2009/0222780 A1* | 9/2009 | Smith | G06F 17/505 716/113 |

(Continued)

FOREIGN PATENT DOCUMENTS

WO    WO2008153667 A2    12/2008

*Primary Examiner* — Mohammed Alam
(74) *Attorney, Agent, or Firm* — Cantor Colburn LLP; Jennifer Anda

(57) ABSTRACT

Aspects relate to a computer implemented method for timing analysis and pessimism removal of an integrated circuit. The computer implemented method includes performing, using a processor, a static timing analysis of the integrated circuit and generating timing data, generating a light weight path signature of a path using the generated timing data, performing common path pessimism removal (CPPR) using the light weight path signature and generating CPPR information, and storing, in a storage medium, the light weight path signature and the corresponding CPPR information. The method also includes generating a timing report using the light weight path signature and the corresponding CPPR information, wherein the timing report includes full path details generated using at least the light weight path signature, and reporting the timing report with full path details and corresponding CPPR information.

20 Claims, 7 Drawing Sheets

(56) References Cited

U.S. PATENT DOCUMENTS

| | | | |
|---|---|---|---|
| 2011/0035714 A1* | 2/2011 | Foreman | G06F 17/5031 716/108 |
| 2012/0124534 A1* | 5/2012 | Kalafala | G06F 17/504 716/108 |
| 2012/0311515 A1* | 12/2012 | Zolotov | G06F 8/20 716/108 |
| 2017/0046469 A1* | 2/2017 | Rao | G06F 17/5077 |

* cited by examiner

| LWPS | CP credit / Common Pt | Coupling adjust | Post-CPPR slack |
|---|---|---|---|
| D→G→N | - | 5 | -20 |
| D→G→A | 10 / A | 4 | -18 |
| D→J→N | - | 3 | -10 |
| D→J→A | 10 / A | 2 | 0 |

FIG. 5

SYSTEM AND METHOD FOR COMBINED PATH TRACING IN STATIC TIMING ANALYSIS

BACKGROUND

The present disclosure relates generally to path tracing and, more specifically, to combined path tracing in static timing analysis.

Calculating path delay in signal propagation within an integrated circuit (IC) can be done by analyzing a particular IC design using computer tools that estimate signal propagation delays throughout the IC in order to determine the maximum operating frequency of the IC. However, the signals may propagate to their destination through different paths, thus causing the signals to reach their destination at different times depending on the signal delay through each of the paths. Therefore, there exists an interest in finding out what the path delays are in the IC to determine if the application and operating frequency are appropriate for the design. Given the large amounts of registers, gates, buffers, wires, etc. in ICs common in current devices, the calculation, adjustment, and reporting of all possible paths require vast amounts of time and computer resources. It is in this context that embodiments of the invention arise.

For example, due to the increase in size and complexity of integrated circuits, it has become necessary to use sophisticated tools to verify timing constraints. Particularly, before the advent of Static Timing Analysis (STA), timing constraints were typically verified using simulation-based techniques. As the complexity of integrated circuits grew, using simulation-based techniques to verify timing constraints became impractical because of their long runtimes, low capacities, and incomplete analyses.

Unlike simulation-based techniques, STA verifies timing by computing bounds on delay values. The goal of static timing analysis (STA) is to determine the earliest and latest possible switching times of various signals within a digital circuit. STA can generally be performed at the transistor level or at the gate level, using pre-characterized library elements, or at higher levels of abstraction, for complex hierarchical chips.

Under certain circumstances, the approach described above can result in an overly pessimistic estimate of timing performance. One such overly pessimistic scenario occurs in the situation in which early and late propagation delays are different (e.g. to account for process variability), and both early and late mode signals involved in a timing test share a common part of their propagation paths (typically the clock). In such a scenario, while an exact value of propagation delay for the common propagation elements is unknown, it is typically impossible for such common delay elements to be operating at both early and late delay extremes simultaneously, and hence, slack computed using extremes of late data and early clock arrival times (or vice versa) at a test results in an overly pessimistic bound on circuit performance. This pessimism can be reduced, or even fully removed, by the technique of common path pessimism removal (CPPR). After such a technique is implemented, paths are then traced again to generate a timing report, thereby adding a large amount of additional processing.

Accordingly, there is a need for a system and a method for efficiently performing static timing analysis which is amenable to time consuming steps such as CPPR, traversing paths for identifying a set of critical paths, generating timing reports, and similar procedures.

SUMMARY

In accordance with an embodiment, a computer implemented method for timing analysis and pessimism removal of an integrated circuit is provided. The computer implemented method includes performing, using a processor, a static timing analysis of the integrated circuit and generating timing data, generating, using the processor, a light weight path signature of a path using the generated timing data, performing, using the processor, common path pessimism removal (CPPR) using the light weight path signature and generating CPPR information, storing, in a storage medium, the light weight path signature and the corresponding CPPR information, generating, using the processor, a timing report using the light weight path signature and the corresponding CPPR information, wherein the timing report includes full path details generated using at least the light weight path signature, and reporting, using the processor, the timing report with full path details and corresponding CPPR information.

In accordance with another embodiment, a system for timing analysis and pessimism removal a messaging system is provided. The system includes an integrated circuit comprising one or more paths, a storage medium having computer readable instructions, and a processor configured to execute the computer readable instructions. The computer readable instructions includes performing, using a processor, a static timing analysis of the integrated circuit and generating timing data, generating, using the processor, a light weight path signature of a path using the generated timing data, performing, using the processor, common path pessimism removal (CPPR) using the light weight path signature and generating CPPR information, storing, in a storage medium, the light weight path signature and the corresponding CPPR information, generating, using the processor, a timing report using the light weight path signature and the corresponding CPPR information, wherein the timing report includes full path details generated using at least the light weight path signature, and reporting, using the processor, the timing report with full path details and corresponding CPPR information.

In accordance with a further embodiment, a computer program product for timing analysis and pessimism removal of an integrated circuit, the computer program product comprising a computer readable storage medium having program instructions embodied therewith. The program instructions executable by a processor to cause the processor to perform a static timing analysis of the integrated circuit, generate a light weight path signature of the path using the generated timing data, perform common path pessimism removal (CPPR) using the light weight path signature and generating CPPR information, store, in the computer readable storage medium, the light weight path signature and the corresponding CPPR information, generate a timing report using the light weight path signature and the corresponding CPPR information, wherein the timing report includes full path details generated using at least the light weight path signature, and report the timing report with full path details and corresponding CPPR information.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, as well as the and advantages of the invention, are apparent from the following detailed description taken in conjunction with the accompanying drawings in which:

FIG. 5 depicts a table that contains path information according to some embodiments of this disclosure.

DETAILED DESCRIPTION

It is understood in advance that although this disclosure includes a detailed description on a target circuit board with one or more paths and processing equipment to process the path data, implementation of the teachings recited herein are not limited to such an environment. Rather, embodiments of the present invention are capable of being implemented in conjunction with any other type of computing environment now known or later developed.

One or more embodiments described herein are directed to a computer implemented method for timing analysis and pessimism removal of an integrated circuit. The computer implemented method includes performing, using a processor, a static timing analysis of the integrated circuit and generating timing data for a path, generating a light weight path signature of the path using the generated timing data, which may also include path data, performing common path pessimism removal (CPPR) using the light weight path signature and generating CPPR information, and storing, in a storage medium, the light weight path signature and the corresponding CPPR information. The method also includes generating a timing report using the light weight path signature and the corresponding CPPR information, wherein the timing report includes full path details generated using at least the light weight path signature, and reporting the timing report with full path details and corresponding CPPR information.

Figure 1:
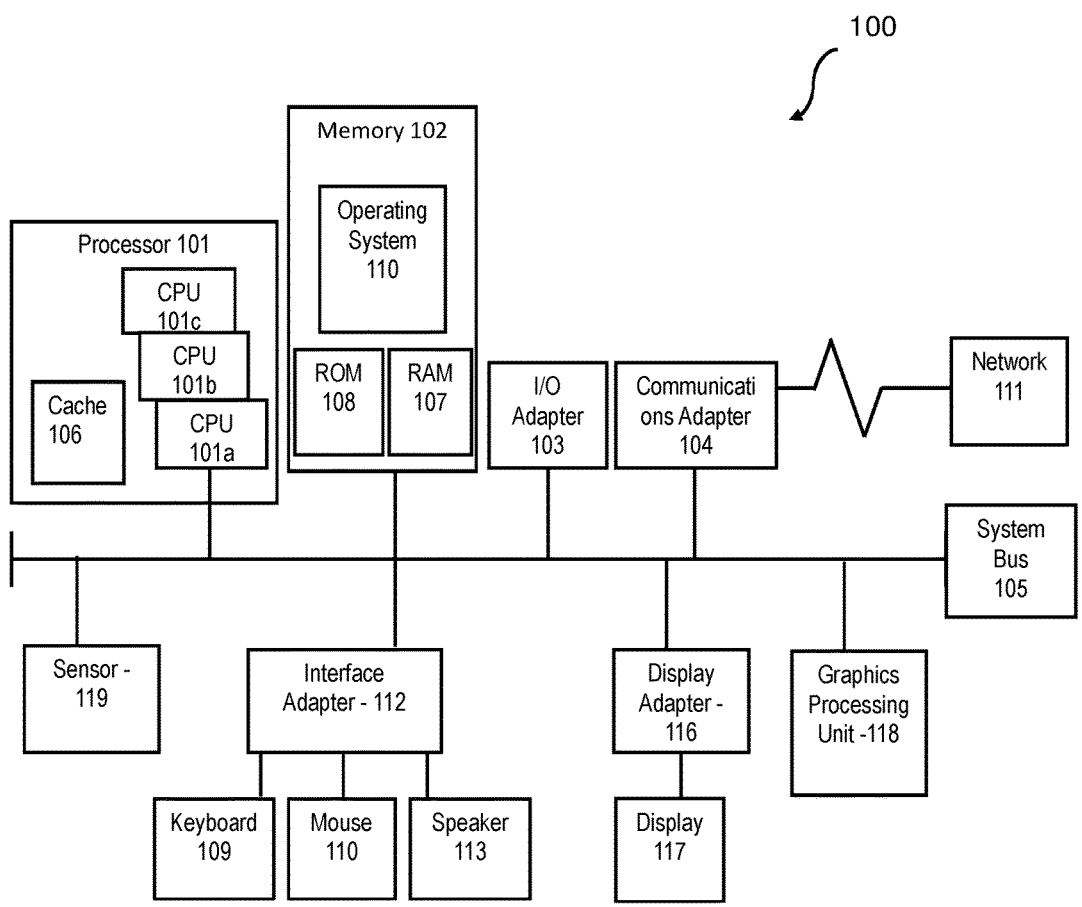
FIG. 1 depicts a block diagram of an electronic computing device in accordance with some embodiments of this disclosure.

Turning now to FIG. 1, an electronic computing device 100, which may also be called a computer system 100, that includes a plurality of electronic computing device sub-components is generally shown in accordance with one or more embodiments. Particularly, FIG. 1 illustrates a block diagram of a computer system 100 (hereafter "computer 100") for use in practicing the embodiments described herein. The methods described herein can be implemented in hardware, software (e.g., firmware), or a combination thereof. In an exemplary embodiment, the methods described herein are implemented in hardware, and may be part of the microprocessor of a special or general-purpose digital computer, such as a personal computer, workstation, minicomputer, or mainframe computer. Computer 100 therefore can embody a general-purpose computer. In another exemplary embodiment, the methods described herein are implemented as part of a mobile device, such as, for example, a mobile phone, a personal data assistant (PDA), a tablet computer, etc.

In an exemplary embodiment, in terms of hardware architecture, as shown in FIG. 1, the computer 100 includes processor 101. Computer 100 also includes memory 102 coupled to processor 101, and one or more input and/or output (I/O) adaptors 103, that may be communicatively coupled via a local system bus 105. Communications adaptor 104 may be operatively connect computer 100 to one or more networks 111. System bus 105 may also connect one or more user interfaces via interface adaptor 112. Interface adaptor 112 may connect a plurality of user interfaces to computer 100 including, for example, keyboard 109, mouse 110, speaker 113, etc. System bus 105 may also connect display adaptor 116 and display 117 to processor 101. Processor 101 may also be operatively connected to graphical processing unit 118.

Further, the computer 100 may also include a sensor 119 that is operatively connected to one or more of the other electronic sub-components of the computer 100 through the system bus 105. The sensor 119 can be an integrated or a standalone sensor that is separate from the computer 100 and may be communicatively connected using a wire or may communicate with the computer 100 using wireless transmissions.

Processor 101 is a hardware device for executing hardware instructions or software, particularly that stored in a non-transitory computer-readable memory (e.g., memory 102). Processor 101 can be any custom made or commercially available processor, a central processing unit (CPU), a plurality of CPUs, for example, CPU 101a-101c, an auxiliary processor among several other processors associated with the computer 100, a semiconductor based microprocessor (in the form of a microchip or chip set), a macroprocessor, or generally any device for executing instructions. Processor 101 can include a memory cache 106, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 106 may be organized as a hierarchy of more cache levels (L1, L2, etc.).

Memory 102 can include random access memory (RAM) 107 and read only memory (ROM) 108. RAM 107 can be any one or combination of volatile memory elements (e.g., DRAM, SRAM, SDRAM, etc.). ROM 108 can include any one or more nonvolatile memory elements (e.g., erasable programmable read only memory (EPROM), flash memory, electronically erasable programmable read only memory (EEPROM), programmable read only memory (PROM), tape, compact disc read only memory (CD-ROM), disk, cartridge, cassette or the like, etc.). Moreover, memory 102 may incorporate electronic, magnetic, optical, and/or other types of non-transitory computer-readable storage media. Note that the memory 102 can have a distributed architecture, where various components are situated remote from one another, but can be accessed by the processor 101.

The instructions in memory 102 may include one or more separate programs, each of which comprises an ordered listing of computer-executable instructions for implementing logical functions. In the example of FIG. 1, the instructions in memory 102 may include a suitable operating system 110. Operating system 110 can control the execution of other computer programs and provides scheduling, input-output control, file and data management, memory management, and communication control and related services.

Input/output adaptor 103 can be, for example but not limited to, one or more buses or other wired or wireless connections, as is known in the art. The input/output adaptor 103 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

Interface adaptor 112 may be configured to operatively connect one or more I/O devices to computer 100. For example, interface adaptor 112 may connect a conventional keyboard 109 and mouse 110. Other output devices, e.g., speaker 113 may be operatively connected to interface adaptor 112. Other output devices may also be included, although not shown. For example, devices may include but are not limited to a printer, a scanner, microphone, and/or the like. Finally, the I/O devices connectable to interface adaptor 112 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like.

Computer 100 can further include display adaptor 116 coupled to one or more displays 117. In an exemplary embodiment, computer 100 can further include communications adaptor 104 for coupling to a network 111.

Network 111 can be an IP-based network for communication between computer 100 and any external device. Network 111 transmits and receives data between computer 100 and external systems. In an exemplary embodiment, network 111 can be a managed IP network administered by a service provider. Network 111 may be implemented in a wireless fashion, e.g., using wireless protocols and technologies, such as WiFi, WiMax, etc. Network 111 can also be a packet-switched network such as a local area network, wide area network, metropolitan area network, Internet network, or other similar type of network environment. The network 111 may be a fixed wireless network, a wireless local area network (LAN), a wireless wide area network (WAN) a personal area network (PAN), a virtual private network (VPN), intranet or other suitable network system.

If computer 100 is a PC, workstation, laptop, tablet computer and/or the like, the instructions in the memory 102 may further include a basic input output system (BIOS) (omitted for simplicity). The BIOS is a set of essential routines that initialize and test hardware at startup, start operating system 110, and support the transfer of data among the operatively connected hardware devices. The BIOS is stored in ROM 108 so that the BIOS can be executed when computer 100 is activated. When computer 100 is in operation, processor 101 may be configured to execute instructions stored within the memory 102, to communicate data to and from the memory 102, and to generally control operations of the computer 100 pursuant to the instructions.

According to one or more embodiments, any one of the electronic computing device sub-components of the computer 100 includes a circuit board connecting circuit elements that process data. The circuit board and/or circuit elements within any one or more of the sub-components include an integrated circuit (IC) with one or more paths that are provided on the IC through which data signals can propagate. Thus, path tracing and timing analysis can be done for any of the sub-components or elements therein. For example, the processor 101 can include multiple CPUs 101c, 101b, 101a and a cache 106 on which multiple different paths can be integrally formed thereby providing a plurality of path options for data to propagate.

Also paths can be provided through a combination of any of the electronic computing device sub-components to form one or more of the different data paths available in the system. For example, the sensor 119 can include an IC that transmits a data signal through a wire of system bus 105 along to the graphics processing unit 118 that also has an IC which in turn transmits the processed data signal to a display adapter 116 which finally sends the data signal to the display 117 providing a multiple sub-component data path that involves multiple ICs, wires, and elements. Thus, path tracing and timing analysis can be done for a combination of the sub-components and elements therein.

Accordingly, one or more paths are provided on one or more ICs through which data signals can propagate. Thus, path tracing and timing analysis can be done for one or more of the sub-components of the computer system 100.

Figure 2:
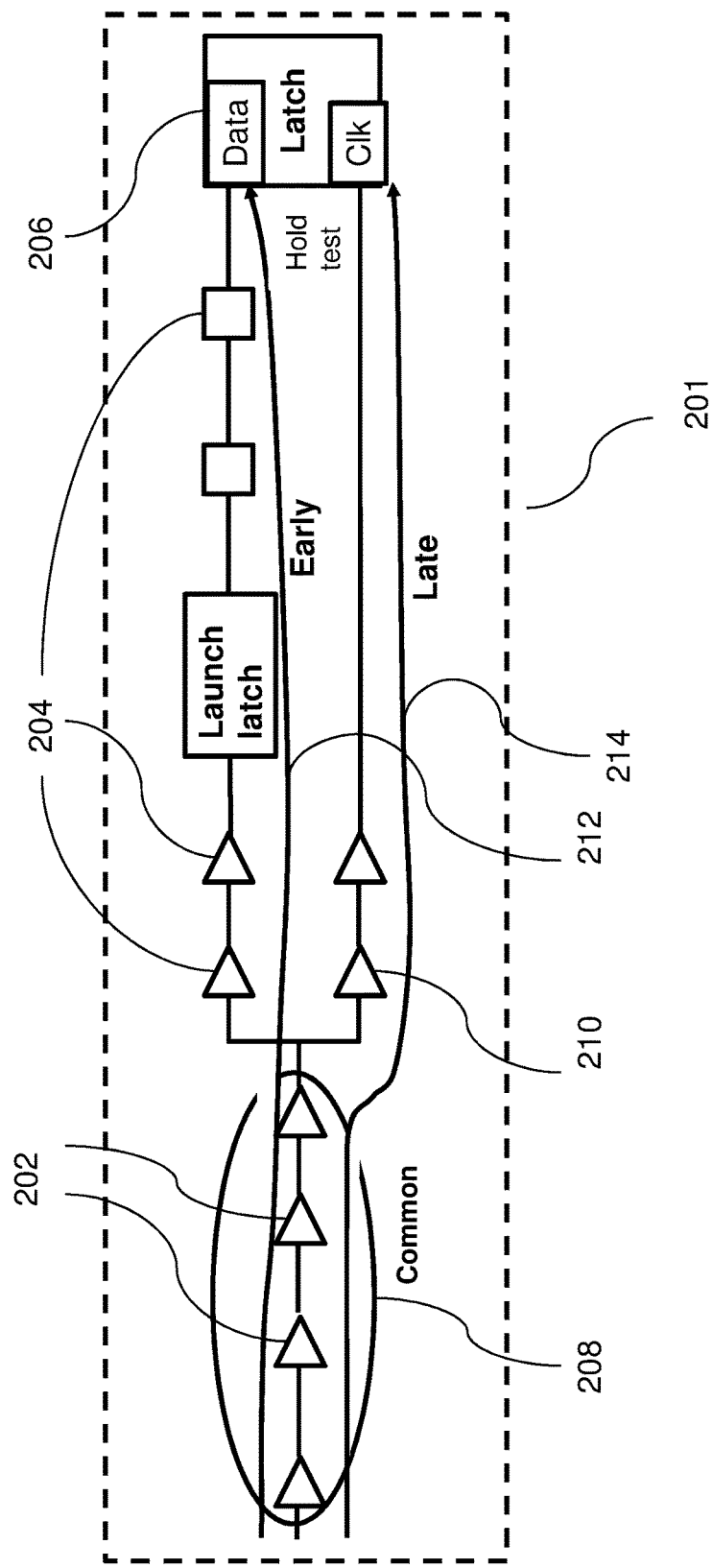
FIG. 2 depicts a block diagram of an electronic computing device sub-component, according to some embodiments of this disclosure.

For example, turning now to FIG. 2, an electronic computing device sub-component 201 is shown which can undergo tracing and timing analysis in accordance with one or more embodiments. The electronic computing device sub-component 201 can be any one of the sub-components shown in FIG. 1, a subpart of the sub-components, or a combination of sub-components. The electronic computing device sub-component 201 includes an integrated circuit (IC) that includes circuit elements 202, 204, 206, and 210. The circuit elements 202, 204, 206, and 210 may be any one or more of a connecting wire, a cell, a resistor, a diode, a capacitor, an inductor, a resistor, a voltage source, a logic gate, a latch, an inverter, or some other known circuit element or combination thereof. It can be appreciated that the circuit elements 202 are not limited to these example and may be any other known element that can cause a delay along an IC path. Circuit elements 202 are elements that are found in common for more than one path through the IC. These circuit elements 202 are the subject of a common path pessimism removal (CPPR) approach which uncovers this commonality, calculates credit information that is used to generate the CPPR information for a path.

As shown, the sub-component 201 includes an early path 212 and a late path 214 that traverse through a number of common elements 202 found within a common area 208 and other elements that are provided along only one of the early or late path. For example, circuit elements 204 are provided along the early path 212 and may be similar elements or may be a variety of different circuit elements as shown. Along this early path 212 there may also be other elements such as a launch latch as shown. The early path 212 is generally calculated assuming a fastest timing value. In contrast, the late path 214 is calculated assuming a slowest timing value for the path along which generally fewer circuit elements 210 are provided. This approach to tracing and timing analysis is known as static timing analysis. The timing data generated by the static timing analysis can be used to generate light weight path signatures. Further, for the common portion 208, a CPPR approach can be implemented to more accurately account for the common circuit elements 202 which can be done using the light weight path signatures thereby avoiding having to retrace paths. After the static timing analysis and the CPPR processing are complete, a timing report is generated. This report is generated using the already calculated CPPR information and light weight path signatures that are stored and/or cached thereby also avoiding the need to retrace paths of the sub-component 201.

Figure 3:
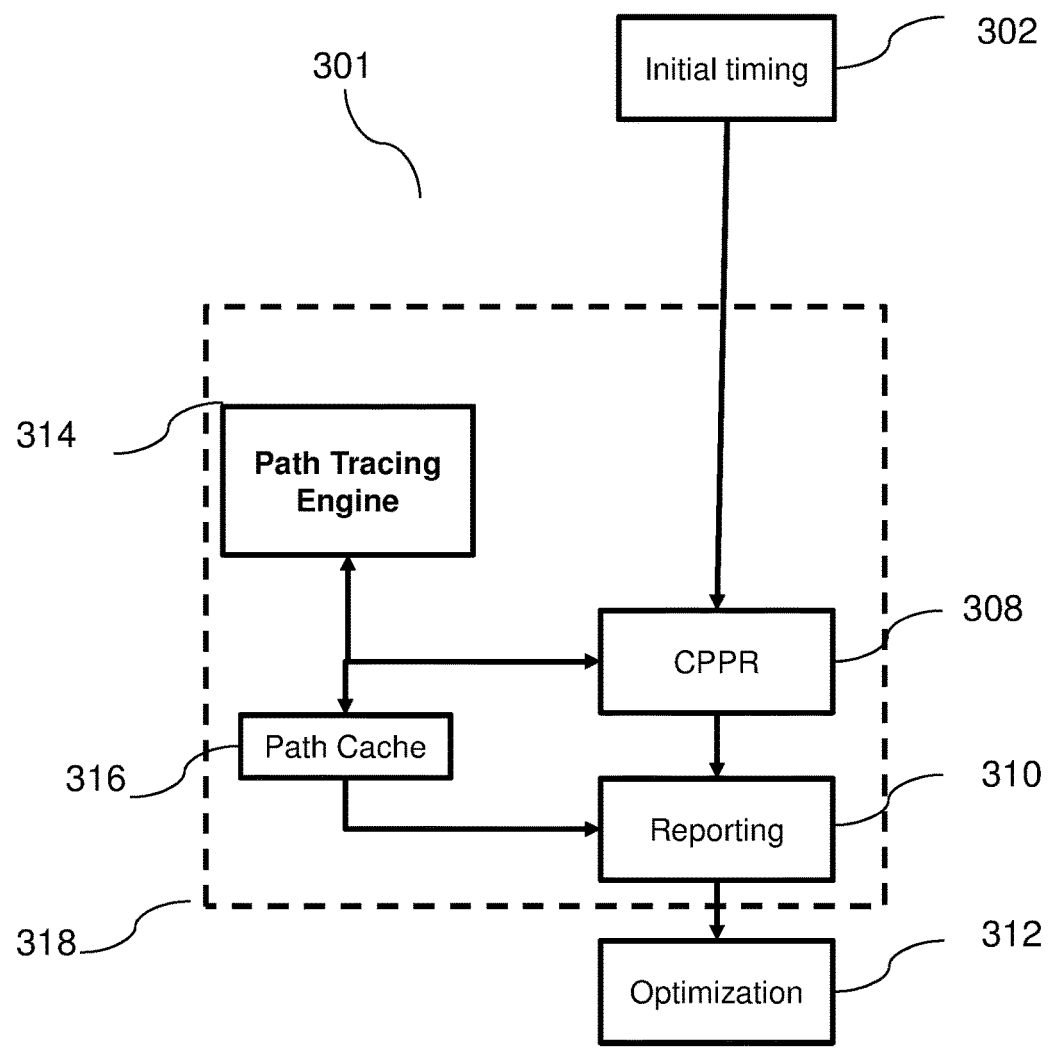
FIG. 3 depicts a block diagram of a processing system for timing analysis, pessimism removal, and reporting according to some embodiments of this disclosure.

Turning now to FIG. 3, a logic block diagram of a processing system 301 for timing analysis, pessimism removal, and reporting is shown in accordance with some embodiments of this disclosure. The processing system 301 includes initial timing 302, which is executed according to a static timing analysis technique. The processing system also includes a CPPR 308 and reporting 310 as well as optimization 312. The processing system also includes a path tracing engine 314 that is configured to help process and provide cached path information.

Particularly in an operating phase 318 the CPPR technique 308 can be executed using cached path information. This is possible because the cached path information includes light weight path signatures for each path. The light weight path signatures allow the CPPR technique 308 to generate full path details from the corresponding light weight path signature for a desired path. The CPPR technique 308 then caches generated CPPR information along with the corresponding cached light weight path signature into a path cache 316. Accordingly, the processing system 301 can then handle reporting 310 through the use of the cached path information. Particularly, reporting 310 retrieve from the path cache 316 and uses the cached light weight path signature and corresponding CPPR information to generate a timing report that is subsequently reported out and can be used then for optimization 312.

Figure 4A:
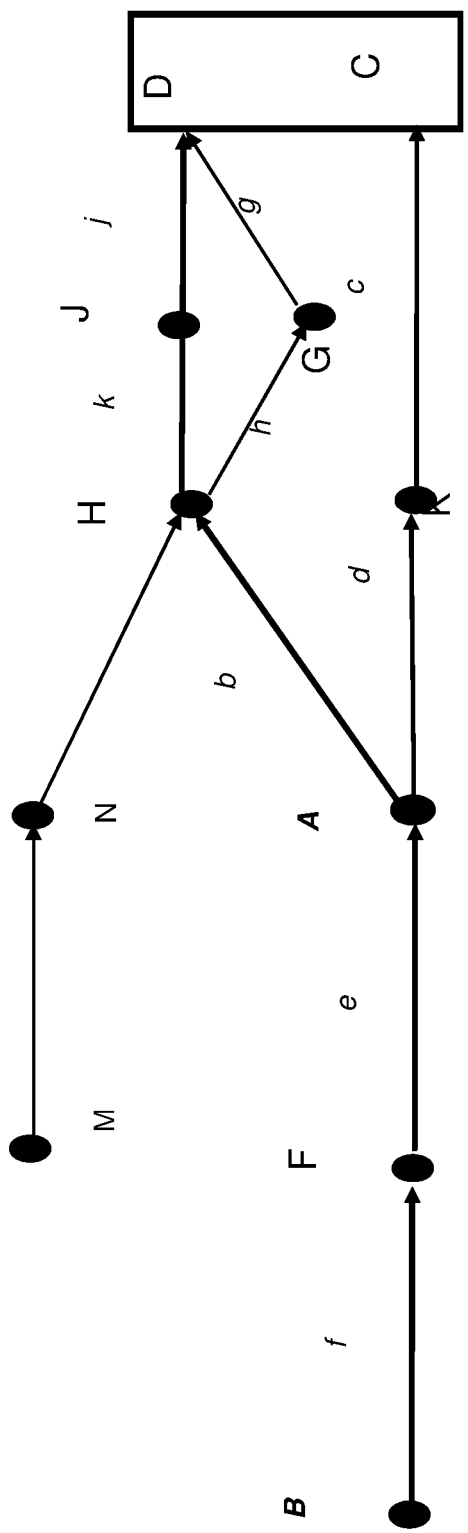
FIG. 4A depicts structure mapping information for an IC according to some embodiments of this disclosure.

Turning now to FIG. 4A, structure mapping information for paths through an IC is shown in accordance with some embodiments of this disclosure. For example, a first signal can originate at path-start node M. The first signal can then travel to node N and on the node H. Node H is a branch-point node. At this branch-point node H the first signal can travel along an edge k to node J or along an edge h to node G. From either node J or node G the first signal can then travel on to path-endpoint node D.

According to another shown example, a second signal can originate at path-start node B. The second signal can then travel along edge f to node F and continue on along edge e to branch-point node A. At branch-point node A the second signal can travel along edge d to node K and continue along edge c to path-endpoint node C. Alternatively, from branch-point node A the second signal can travel along edge b to another branch-point node H. At this branch-point node H the second signal can travel along an edge k to node J or along an edge h to node G. From either node J or node G the second signal can then travel on to path-endpoint node D.

Figure 4B:
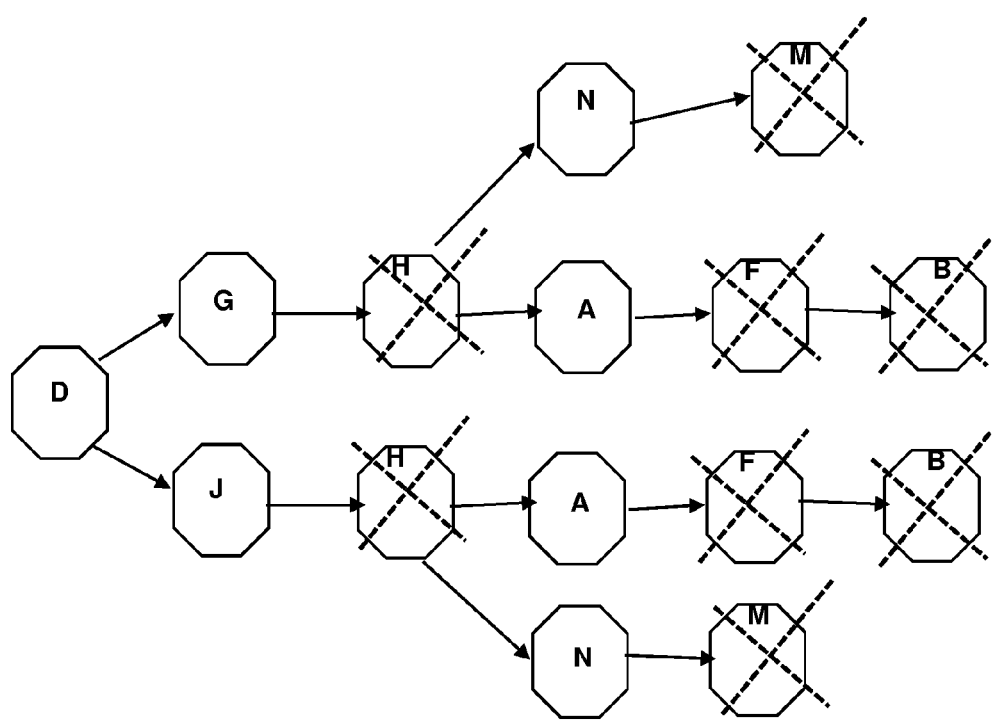
FIG. 4B depicts path mapping of a signal through an IC according to some embodiments of this disclosure.

Turning now to FIG. 4B, path mapping of a signal through an IC is shown in accordance with some embodiments of this disclosure, which has the structure mapping information as shown in FIG. 4A. This path mapping also shows how a light weight path signature is generated according to one or more embodiments. As shown, the path mapping begins at the path-endpoint node D and traces the path backwards starting from this path-endpoint node D. The path-endpoint node D appears as a branch-node when looking at the path flow backwards. Particularly, looking at FIG. 4A, it can be appreciated that from path-endpoint node D a signal can take one of two paths either towards node J or G. Accordingly FIG. 4B shows this by providing two branches of node D going to either node J or G. Both path options are now traced according to the IC structure mapping information. As shown both paths lead to node H, which is a branch-point node. Looking now at the upper path shown in FIG. 4B first, from node H the path can continue on to either node N or node A. From node N the path can only continue on to path-start node M. Similarly, from node H, the path can go to node A and can only then continue on to node F and then to path-start node B. Looking now at the lower path, similar paths are mapped out that go from node H to either node A or node N and then onto either nodes F and B or node M, respectively.

From these path mappings selection of certain nodes and pruning of other nodes can be done to create light weight path signatures for each path. For example, as shown in FIG. 4B, there are four different paths than can be traced from the path-endpoint node D. The full path can be represented as follows: a first path would be D→G→H→N→M; a second path would be D→G→H→A→F→B; a third path would be D→J→H→A→F→B; and a fourth path would be D→J→H→N→M.

A light weight path signature for the first path can be generated by pruning out the nodes that do not correspond to a branch decision. Thus, nodes H and M can be pruned or removed. Thus the light weight path signature of the first path would be D→G→N. Similarly the light weight path signatures of the other paths would be as follows: the second path's light weight path signature is D→G→A; the third path's light weight path signature is D→J→A; and the fourth path's light weight path signature is D→J→N. Using any one of the light weight path signatures and the structure mapping information for the IC through with the path traverses, the corresponding full path details for the path than corresponds to the light weight path signature selected can be created or built. Accordingly, the light weight path signatures can be stored or cached given there substantially reduced size and used in place of trying to store entire path data or retracing paths.

According to another embodiment, the paths can be generated starting from the path-start node and ending to the path-endpoint node. Accordingly, the corresponding light weight path signatures would also start with the path-start node and end with the path-endpoint node while including branch-point nodes there between.

Turning now to FIG. 5, a table that contains path information is shown in accordance with some embodiments of this disclosure. In the first column are provided the light weight path signatures. These light weight path signatures can be used to execute CPPR, without having to retrace all the paths, which generates CPPR information. The second, third, and fourth columns contain the generated CPPR information for each of the paths as well as values generated from processing the CPPR information to provide the pessimism reduction and optimization.

Figure 6:
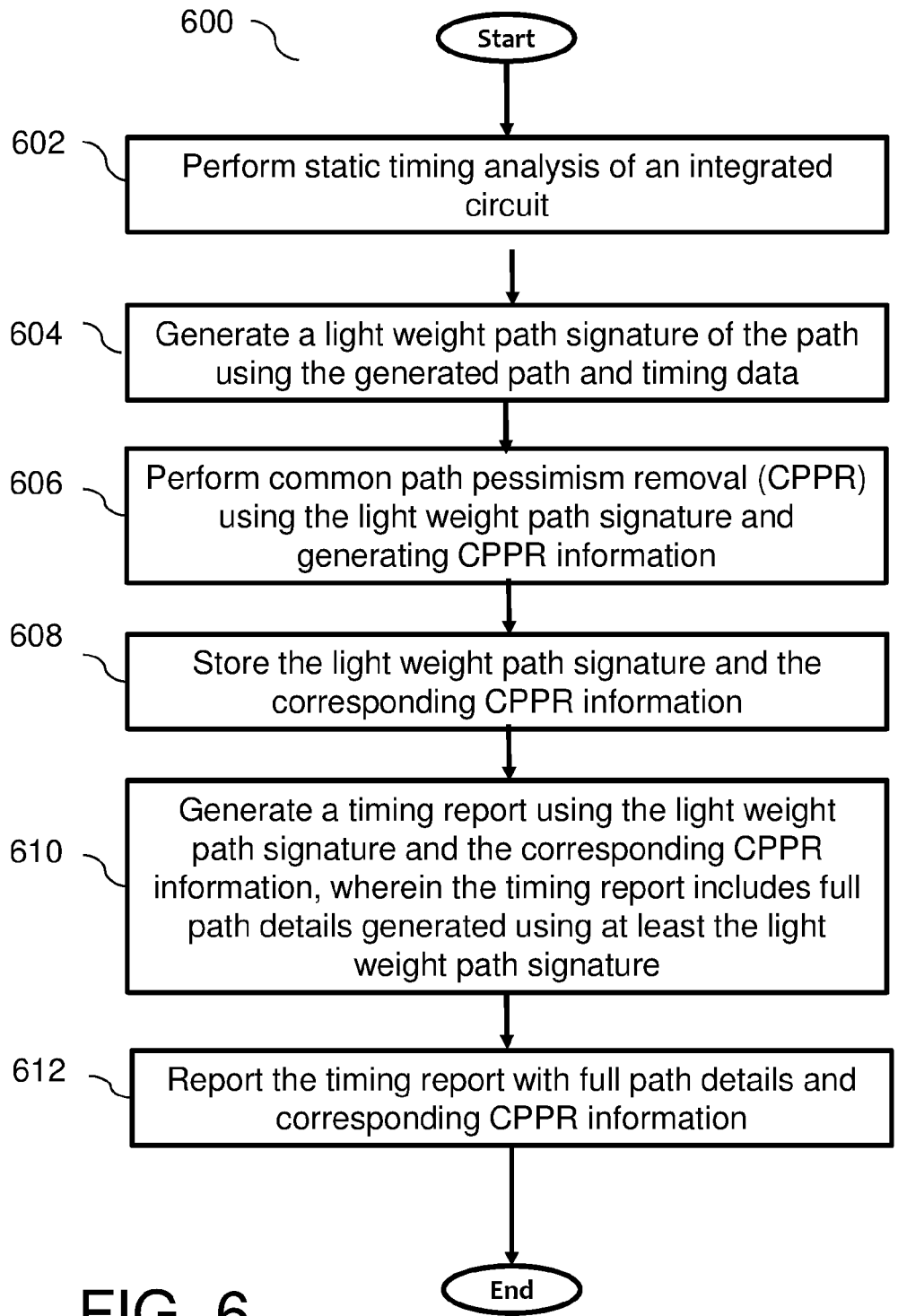
FIG. 6 depicts a computer implemented method for timing analysis and pessimism removal of an integrated circuit (IC), according to some embodiments of this disclosure.

Turning now to FIG. 6, a computer implemented method 600 for timing analysis and pessimism removal of an integrated circuit (IC) is shown in accordance with some embodiments of this disclosure. The computer implemented method 600 for timing analysis and pessimism removal of an integrated circuit includes performing, using a processor, a static timing of the integrated circuit and generating timing data (operation 602). The method also includes generating, using the processor, a light weight path signature of the path using the generated timing data (operation 604) and performing, using the processor, common path pessimism removal (CPPR) using the light weight path signature and generating CPPR information (operation 606). Further, the method includes storing, in a storage medium, the light weight path signature and the corresponding CPPR information (operation 608). The method also includes generating, using the processor, a timing report using the light weight path signature and the corresponding CPPR information, wherein the timing report includes full path details generated using at least the light weight path signature (operation 610). Finally, the method includes reporting, using the processor, the timing report with full path details and corresponding CPPR information (operation 612).

In accordance with one or more embodiments the method can specifically generate the light weight path signature of the path using the generated timing data as follows. Initially, a path-endpoint node of the path is select from the timing data. The path is then traced backwards from the path-endpoint node. Then each branch-point node taken at each stage of backward tracing is selected and unselected nodes are pruned out. The path-endpoint node and the selected branch-point nodes are then organized into the light weight path signature.

According to another embodiment, the method can generate, using the processor, the light weight path signature of the path using the generated timing data as follows. The method includes selecting a path-start node of the path from the timing data and tracing the path forwards from the path-start node. The method also includes selecting each branch-point node taken at each stage of forward tracing and pruning out unselected nodes. Further, the method includes organizing the path-start node and the selected branch-point nodes into the light weight path signature.

According to another embodiment, the method further includes performing, using the processor, static timing of the integrated circuit and generating timing data for a plurality of paths. The method also includes generating, using the processor, a plurality of light weight path signatures for each of the plurality of paths using the generated timing data. The method also includes performing, using the processor, common path pessimism removal (CPPR) using each of the plurality of light weight path signatures and generating a plurality of corresponding CPPR information for each of the plurality of light weight path signatures and storing, in a storage medium, the plurality of light weight path signatures and the plurality of corresponding CPPR information. Further, the method includes generating, using the processor, a timing report using the plurality of light weight path signatures and the plurality of corresponding CPPR information, wherein the timing report includes full path details generated for each of the plurality of light weight path signatures, and reporting, using the processor, the timing report with full path details and corresponding CPPR information.

According to another embodiment, the method can perform, using the processor, common path pessimism removal (CPPR) using the light weight path signature and generating CPPR information as follows. The method builds the full path details using the light weight path signature and structure mapping information of the integrated circuit and identifies a common path portion from the full path details. The method then calculates credit information for the identified common path portion, and includes the credit information in the CPPR information.

According to another embodiment, the method can generate, using the processor, the timing report using the light weight path signature and the corresponding CPPR information as follows. The method can select the light weight path signature and the corresponding CPPR information and generate the full path details using the light weight path signature and structure mapping information of the integrated circuit. The method can then apply the CPPR information to the full path details and generate the timing report that includes the full path details.

According to another embodiment, the method can store, in the storage medium, the light weight path signature and the corresponding CPPR information as follows. The method can cache the light weight path signature and corresponding CPPR information. The storage medium can be at least one from a group consisting of a central processing unit (CPU) cache, a graphics processing unit (GPU) cache, a disk cache, a page cache, a web cache, a buffer, and a distributed cache.

According to one or more embodiments, subsequent path-based reporting can recreate a path in the event that a cached light weight path signature is not found. Further, a system and method in accordance with one or more embodiments can be used with one or more of a statistical CPPR based on statistic path tracing, statistical CPPR based on deterministic path tracing, and deterministic CPPR.

According to one or more embodiments, initial static timing analysis may include a plurality of corner-based runs, in order to measure timing performance across an ensemble of process, environmental, and functional conditions.

According to one more embodiments, initial static timing analysis may furthermore comprise a statistical static timing analysis, to capture the effects of process, environmental and other sources of variation.

Technical effects and benefits of some embodiments include, but are not limited to, the following. For example re-tracing avoidance for paths for timing report generation is provided. This provides runtime reduction and increased accuracy in reporting in part due to not having path limiting heuristics. The disclosed embodiments also provide improved CPPR reporting handshake also providing independence from path peeling order and supports additional filtering. The disclosed embodiments also provide a reduced number of intermediate nodes for storage and the nodes that are stored can be cached with minimum information. Duplicate path tracing can be avoided to improve runtime. This can also be applied to multi-threaded CPPR while reducing overhead of extra tracing. Further no path limiting heuristics are needed for reporting. Robust CPPR reporting interface can be provided with increased accuracy in path slack values along with the additional filtering in reporting.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Java, Smalltalk, C++, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A computer implemented method for timing analysis and pessimism removal of an integrated circuit, the computer implemented method comprising:
   performing, using a processor, a static timing analysis of the integrated circuit and generating timing data;
   generating, using the processor, a light weight path signature of a path using the generated timing data;
   performing, using the processor, common path pessimism removal (CPPR) using the light weight path signature and generating CPPR information;
   storing, in a storage medium, the light weight path signature and the CPPR information;
   generating, using the processor, a timing report using the light weight path signature and the CPPR information, wherein the timing report includes full path details generated using at least the light weight path signature; and
   reporting, using the processor, the timing report with full path details and corresponding CPPR information.

2. The computer implemented method of claim 1, wherein generating, using the processor, the light weight path signature of the path using the generated timing data comprises:
   selecting a path-endpoint node of the path from the timing data;
   tracing the path backwards from the path-endpoint node;
   selecting each branch-point node taken at each stage of backward tracing and pruning out unselected nodes; and
   organizing the path-endpoint node and the selected branch-point nodes into the light weight path signature.

3. The computer implemented method of claim 1, wherein generating, using the processor, the light weight path signature of the path using the generated timing data comprises:
   selecting a path-start node of the path from the timing data;
   tracing the path forwards from the path-start node;
   selecting each branch-point node taken at each stage of forward tracing and pruning out unselected nodes; and
   organizing the path-start node and the selected branch-point nodes into the light weight path signature.

4. The computer implemented method of claim 1, further comprising:
   performing, using the processor, a static timing analysis of the integrated circuit and generating timing data for a plurality of paths;
   generating, using the processor, a plurality of light weight path signatures for each of the plurality of paths using the generated timing data;
   performing, using the processor, common path pessimism removal (CPPR) using each of the plurality of light weight path signatures and generating a plurality of corresponding CPPR information for each of the plurality of light weight path signatures;
   storing, in a storage medium, the plurality of light weight path signatures and the plurality of corresponding CPPR information;
   generating, using the processor, a timing report using the plurality of light weight path signatures and the plurality of corresponding CPPR information, wherein the timing report includes full path details generated for each of the plurality of light weight path signatures; and
   reporting, using the processor, the timing report with full path details and corresponding CPPR information.

5. The computer implemented method of claim 1, wherein the static timing analysis is performed using a plurality of corner-based timing runs.

6. The computer implemented method of claim 5, wherein the static timing analysis is a statistical static timing analysis (SSTA).

7. The computer implemented method of claim 1, wherein performing, using the processor, common path pessimism removal (CPPR) using the light weight path signature and generating CPPR information comprises:
   building the full path details using the light weight path signature and structure mapping information of the integrated circuit;
   identifying a common path portion from the full path details;
   calculating credit information for the identified common path portion; and
   including the credit information in the CPPR information.

8. The computer implemented method of claim 1, wherein generating, using the processor, the timing report using the light weight path signature and the corresponding CPPR information comprises:
   selecting the light weight path signature and the corresponding CPPR information;
   generating the full path details using the light weight path signature and structure mapping information of the integrated circuit;
   applying the CPPR information to the full path details; and
   generating the timing report that includes the full path details.

9. The computer implemented method of claim 1, wherein storing, in the storage medium, the light weight path signature and the corresponding CPPR information comprises:
   caching the light weight path signature and corresponding CPPR information, wherein the storage medium is at least one from a group consisting of a central processing unit (CPU) cache, a graphics processing unit (GPU) cache, a disk cache, a page cache, a web cache, a buffer, and a distributed cache.

10. A system for timing analysis and pessimism removal, the system comprising:
    an integrated circuit comprising one or more paths;
    a storage medium having computer readable instructions; and
    a processor configured to execute the computer readable instructions, the computer readable instructions comprising:
       performing, using a processor, a static timing analysis of the integrated circuit and generating timing data;
       generating, using the processor, a light weight path signature of a path using the generated timing data;
       performing, using the processor, common path pessimism removal (CPPR) using the light weight path signature and generating CPPR information;
       storing, in a storage medium, the light weight path signature and the CPPR information;

generating, using the processor, a timing report using the light weight path signature and the CPPR information, wherein the timing report includes full path details generated using at least the light weight path signature; and reporting, using the processor, the timing report with full path details and corresponding CPPR information.

11. The system of claim 10, wherein generating, using the processor, the light weight path signature of the path using the generated timing data comprises:

selecting a path-endpoint node of the path from the timing data;

tracing the path backwards from the path-endpoint node;

selecting each branch-point node taken at each stage of backward tracing and pruning out unselected nodes; and organizing the path-endpoint node and the selected branch-point nodes into the light weight path signature.

12. The system of claim 10, wherein generating, using the processor, the light weight path signature of the path using the generated timing data comprises:

selecting a path-start node of the path from the timing data;

tracing the path forwards from the path-start node;

selecting each branch-point node taken at each stage of forward tracing and pruning out unselected nodes; and organizing the path-start node and the selected branch-point nodes into the light weight path signature.

13. The system of claim 10, wherein the computer readable instructions that are configured to execute on the processor further comprise:

performing, using the processor, a static timing analysis of the integrated circuit and generating timing data for a plurality of paths;

generating, using the processor, a plurality of light weight path signatures for each of the plurality of paths using the generated timing data;

performing, using the processor, common path pessimism removal (CPPR) using each of the plurality of light weight path signatures and generating a plurality of corresponding CPPR information for each of the plurality of light weight path signatures;

storing, in a storage medium, the plurality of light weight path signatures and the plurality of corresponding CPPR information;

generating, using the processor, a timing report using the plurality of light weight path signatures and the plurality of corresponding CPPR information, wherein the timing report includes full path details generated for each of the plurality of light weight path signatures; and reporting, using the processor, the timing report with full path details and corresponding CPPR information.

14. The system of claim 10, wherein performing, using the processor, common path pessimism removal (CPPR) using the light weight path signature and generating CPPR information comprises:

building the full path details using the light weight path signature and structure mapping information of the integrated circuit;

identifying a common path portion from the full path details;

calculating credit information for the identified common path portion; and including the credit information in the CPPR information.

15. The system of claim 10, wherein generating, using the processor, the timing report using the light weight path signature and the corresponding CPPR information comprises:

selecting the light weight path signature and the corresponding CPPR information;

generating the full path details using the light weight path signature and structure mapping information of the integrated circuit;

applying the CPPR information to the full path details; and generating the timing report that includes the full path details.

16. The system of claim 10, wherein storing, in the storage medium, the light weight path signature and the corresponding CPPR information comprises:

caching the light weight path signature and corresponding CPPR information, wherein the storage medium is at least one from a group consisting of a central processing unit (CPU) cache, a graphics processing unit (GPU) cache, a disk cache, a page cache, a web cache, a buffer, and a distributed cache.

17. A computer program product for timing analysis and pessimism removal of an integrated circuit, the computer program product comprising a computer readable storage medium having program instructions embodied therewith, the program instructions executable by a processor to cause the processor to:

perform a static timing analysis of the integrated circuit and generating timing data;

generate a light weight path signature of a path using the generated timing data;

perform common path pessimism removal (CPPR) using the light weight path signature and generating CPPR information;

store, in the computer readable storage medium, the light weight path signature and the CPPR information;

generate a timing report using the light weight path signature and the CPPR information, wherein the timing report includes full path details generated using at least the light weight path signature; and report the timing report with full path details and corresponding CPPR information.

18. The computer program product of claim 17, wherein generating the light weight path signature of the path using the generated timing data comprises:

selecting a path-endpoint node of the path from the timing data;

tracing the path backwards from the path-endpoint node;

selecting each branch-point node taken at each stage of backward tracing and pruning out unselected nodes; and organizing the path-endpoint node and the selected branch-point nodes into the light weight path signature.

19. The computer program product of claim 17, wherein the program instructions executable by the processor to cause the processor to further:

perform static timing analysis of the integrated circuit and generating timing data for a plurality of paths;

generate a plurality of light weight path signatures for each of the plurality of paths using the generated timing data;

perform common path pessimism removal (CPPR) using each of the plurality of light weight path signatures and generating a plurality of corresponding CPPR information for each of the plurality of light weight path signatures;

store, in the computer readable storage medium, the plurality of light weight path signatures and the plurality of corresponding CPPR information;

generate a timing report using the plurality of light weight path signatures and the plurality of corresponding CPPR information, wherein the timing report includes full path details generated for each of the plurality of light weight path signatures; and report the timing report with full path details and corresponding CPPR information.

20. The computer program product of claim 17, wherein performing common path pessimism removal (CPPR) using the light weight path signature and generating CPPR information comprises:

building the full path details using the light weight path signature and structure mapping information of the integrated circuit;

identifying a common path portion from the full path details;

calculating credit information for the identified common path portion; and including the credit information in the CPPR information, and wherein generating the timing report using the light weight path signature and the corresponding CPPR information comprises selecting the light weight path signature and the corresponding CPPR information;

generating the full path details using the light weight path signature and structure mapping information of the integrated circuit;

applying the CPPR information to the full path details; and generating the timing report that includes the full path details.

* * * * *